UNITED STATES PATENT OFFICE.

AMBROSE G. FELL, OF NEW YORK, N. Y., ASSIGNOR TO WILLIAM H. SMITH, OF URBANA, ILLINOIS.

MANUFACTURE OF GLUCOSE.

SPECIFICATION forming part of Letters Patent No. 241,202, dated May 10, 1881.

Application filed June 11, 1880. (No specimens.)

*To all whom it may concern:*

Be it known that I, AMBROSE G. FELL, of the city, county, and State of New York, have invented a new and useful Improvement in the Manufacture of Glucose or Sirup from Grain, which invention is fully set forth in the following specification.

This invention has reference to the manufacture of glucose or sirup from corn or other grain, and particularly from the former.

Heretofore the method generally employed has been, first, to separate the starch by such means as are employed for the purpose in the ordinary starch manufacture, and then by acids and heat to convert the starch into glucose. Objection arises to this mode from the loss of gluten, and also of a portion of the starch and of the native saccharine matter, dextrine, and other soluble elements of grain.

The gluten is, in the manufacture of the starch, dissolved by the alkalies or acids, whichever may have been used, or, if the old starch method is employed, by the frequent and prolonged use of much water in the processes of soaking and washing the grain. In either case the nitrogenous constituents of the grain, which constitute the main animal nutrition, are entirely lost. As it is impossible to prevent loss by the mechanical manipulations, the percentage of starch obtained cannot represent the whole amount originally in the grain. The native saccharine matter of the corn, being soluble, becomes a loss in the starch manufacture, and its absence is very discernible in the insipidity of glucose made from said starch. The native dextrine and other soluble elements, as I have said, are also lost.

Another method of obtaining glucose from corn is to treat the corn, in a more or less divided condition, with a solution of sulphuric acid and heat, or, as described in a late patent, with oxalic acid, and then to proceed as if starch were used. The objections to this mode of treatment are more serious than the loss and expense incidental to the starch method; for, while it is true that the soluble native saccharine elements of the corn are saved, thus increasing the sweetness and quantity of the product obtained, still the carbonization and solution of a considerable portion of the gluten takes place, and the presence of it, or its compounds, in the final product is very objectionable, in causing a loss of the flavor, (in this more than counteracting the presence of native sugar,) in darkening the color, in destroying the clearness, and in promoting decomposition of the sirup, if kept for any length of time. These objections would present themselves even if due attention be paid to proper regulation of temperature during the treatment of the grain by the ordinary sulphuric-acid methods, for no regulation of temperature with plain sulphuric-acid solution will prevent solution and colorization of the gluten, &c.

In the description of most of the processes devised for using sulphuric acid, working under pressure of steam is, however, expressly set forth, thus precluding the use of a moderate temperature, and in the others no attention whatever seems to be paid to this matter, and consequently the objections named become greatly aggravated, and the processes of this nature have proved failures.

In this invention the glucose is obtained as free from gluten as in the starch method of manufacture, and the native saccharine matter and all other soluble constituents that are convertible into glucose are saved, and also the entire gluten of the corn is preserved to be used for food for animals. The whole process is performed in less time and at smaller expense, with a larger yield of a much superior flavored product than it is possible to obtain by the methods now in use. One hundred pounds of corn treated in accordance with this invention yield from seventy-five to eighty-one pounds of heavy sirup, while by the old starch method about fifty to fifty-four pounds are obtained.

The grain or corn is treated with nitro-sulphuric acid at temperatures sufficiently high to prevent solution of the gluten, and low enough to prevent charring of the woody fiber or gluten. These temperatures, I have found, should be not lower than 195° Fahrenheit, nor above 214° Fahrenheit. In this treatment the temperature of the material is kept as nearly equal as possible throughout the mass. The use of the compound acid, by reason of its energetical chemical action, shortens the time required for the conversion of the starch into sugar, and the lower temperature at which the conversion takes place avoids the objectionable features stated. After the conversion of the starch has been effected the acid is neutralized, and the saccharine solution is subjected to the operations of filtration to separate it from the insoluble portions of the grain, concentration to precipitate the salts, decolorization by means of sulphurous-acid gas at the same time that concentration is effected, subjection to the action of animal carbon for removing the sulphurous acid, and, finally, concentration to the consistency of sirup required.

The decolorization of the solution by means of sulphurous-acid gas in the vacuum-pans in which the liquor is concentrated is considered an important improvement in itself, as well as in connection with other steps in the process just described. This improvement, however, relates to the treatment of the solution in the manufacture of glucose or sirup from grain as a subsequent operation to the conversion of the starch and separation of the insoluble matters of the grain, and not to the treatment of manufactured cane-sirup, for the treatment of which sulphurous acid has heretofore been introduced thereinto in a vacuum-pan. The solutions in the two cases are very different, both in chemical and physical structure, and the treatment is attended with different results.

The sirup produced is of full flavor and bright color, possessing the native saccharine matter, dextrine, which has itself in operation been converted into glucose and other soluble elements of the grain without being discolored or injured in flavor by the presence of gluten, or of the charred products of gluten or woody fiber. In this way it can be distinguished from glucose-sirup manufactured by the methods before known and used—namely, from starch-glucose—by containing all the natural saccharine elements of the grain, which starch-glucose does not, and from glucose made by the direct action of sulphuric acid upon the corn or grain by the absence of gluten and other impurities incidental to the latter method.

It is not deemed necessary here to describe at length the treatment of the saccharine solutions subsequent to the conversion of the starch into glucose ordinarily employed. Suffice it to say that it is common to neutralize the acid, when used, to filter the solution and to concentrate it.

The following description will enable those skilled in the art to which this invention relates to make and use the same.

No particular quantity of grain is required for treatment in accordance with this invention; but for convenience I will describe the proportions of materials and conditions preferred for treating, say, six thousand pounds of corn.

An open wooden tank of about eleven feet in diameter and five feet deep is employed, which tank is provided with about one hundred and fifty feet of closely-perforated lead pipe for admittance of steam, and has a rake or stirrer similar to those employed in the mash-tuns of breweries. The large extent of steam-pipe, together with the agitation of the stirrers, equally distributes the heat, and this prevents in operation the undue heating of the parts and the carbonization of the woody fiber or gluten which might otherwise result. A tank, such as indicated, is filled about thirty inches deep with water, (by weight about fifteen thousand pounds,) and with this two hundred and sixty pounds of sulphuric acid, 66° Baumé, and forty pounds nitric acid, 36° Baumé, are well mixed by the stirrers. Steam is turned on till the solution attains a temperature of not less than 195° Fahrenheit, since below this temperature I have discovered that the gluten is soluble in the acid solution, while at and above this heat the gluten is gelatinized and remains undissolved. The observance of this matter of temperature is a very important feature of my process, for on it, in connection with the compound acid, depends the flavor and purity of the final product. When the solution has attained the desired temperature of 195° Fahrenheit the corn (preferably in the form of coarse unbolted meal) is added, it taking about thirty minutes to introduce the whole six thousand pounds. The steam, which has remained turned on during the introduction of the corn, is allowed to flow into the tank until the temperature has reached about 210° Fahrenheit, but not over 214° Fahrenheit, since above this temperature carbonization of the cellulose and gluten rapidly takes place, producing disagreeable flavor and dark color in the sirup. The introduction of steam is checked at this stage and the temperature kept at as near 210° Fahrenheit as possible until samples taken from the tank and tested with solution of iodine no longer give the blue color, which shows that free starch is present, the blue being due to the formation of iodide of starch.

As soon as the whole of the starch has been converted partly into dextrine and partly into sugar, indicated by no longer obtaining a blue color on addition of iodine, but a dingy brown in place thereof, (this operation usually requiring about one hour,) the steam is turned almost entirely off and the process continued for another hour, or less, or until a clear bright yellow is obtained on testing with iodine. The conversion is now complete, and the balance of the steam is shut off. Carbonate of lime in any suitable form, as whiting or marble-dust, is now added in just sufficient quantity to neutralize the acid. This point is obtained as soon as the addition of the carbonate ceases to produce effervescence. The saccharine solution, with the undissolved gluten and hulls of the corn floating in it, is now drawn off in a filter-tank of peculiar construction, (which construction will form the subject-matter of a separate application,) and in this tank the mass is kept agitated until it becomes too thick to be conveniently moved, by means of the stirrer, the perfectly clear saccharine solution running off and the gluten and other insoluble elements of the corn remaining in the filter. The outlets for the clear liquor are now stopped, and the tank is refilled with boiling water, in which the insoluble residue of the grain is well washed by means of the stirrers. The water dissolves out the balance of the sulphate of lime produced in neutralizing the acid in the converter. Nearly all the lime-salts have, however, remained dissolved in the clear saccharine solution, and are separated as shown hereinafter. The wash-water from the tank is allowed to run out, the same as the original saccharine solution, but into a separate tank, where it remains until required for use in treatment of a fresh quantity of meal, in place of pure water, thus preventing the loss of the saccharine matter which it contains. The thick residue is next forced out of the tank into a press by means of the same stirrers used for agitation. In the press the residue is squeezed to as near dryness as practicable, and can be used for cattle-food, or, if slightly salted, in order to counteract its insipidity, due to extraction of saccharine matter, and then dried by any convenient means, it constitutes a palatable and wholesome food for horses, and will not spoil by keeping.

The thin saccharine solution obtained from the tank, as described, is passed through animal-charcoal, to extract what color it may have. It is next drawn into a vacuum-pan, such as used in the ordinary sugar-refinery, except that in this case the pan is provided with a perforated coil or pipe, through which sulphurous-acid gas can be drawn into the pan.

During the operation of boiling sulphurous-acid gas is introduced into the liquid. It is, or may be, produced by burning sulphur in a stove in a current of air made by the vacuum of the pan, cooled by passage through a pipe submerged in water, and purified by passage through water contained in a small tank; and it is, in a purified condition, introduced by means of the perforated coil into the boiling liquid in the vacuum-pan. The use of the sulphurous acid during the process of boiling is to bleach any coloring-matter which may be produced in that operation, thus preserving the bright color of the saccharine solution during concentration. As the liquor is concentrated the lime salts produced by neutralizing the acids used are gradually precipitated, and when the liquor attains the gravity of from 25° to 30° Baumé it is drawn off from the pan and allowed to run through double filter-bags, similar to those ordinarily employed in sugar-refineries. The precipitated lime-salts are separated by means of said bags. The liquor is next filtered through animal-charcoal for the extraction of the sulphurous acid, and is then returned to the vacuum-pan and further concentrated to any desired consistency, generally to from 40° to 45° Baumé. This completes the operation.

The foregoing is the plain method of proceeding, but for economic and other reasons it may be desirable to vary these details. For instance, for sake of economizing the acid, and to obtain a more concentrated solution direct from the converter in the first instance, instead of turning off steam as soon as iodine ceases to yield a blue starch reaction, more nitric acid may be added, say one-third of the original amount, (thirteen to fifteen pounds.) The sulphuric acid does not require renewal. Half as much more meal (three thousand pounds) may now be added and proceeded with as in the first instance. A more concentrated saccharine solution is obtained, but it is proportionately more difficult to separate by filtration owing to the increased density. The concentration of the solution may be carried to any point by these means, the difficulty of separation from the undissolved portion of the grain being the objection.

If the color of the sirup obtained is not a matter of importance the first filtration through animal-charcoal may be omitted, and the process may be otherwise slightly varied without departing from the general principle of my invention.

The properties or character of the sirup or glucose has already been sufficiently indicated.

In the foregoing description no explanation has been given of what becomes of the nitric acid. It may be said that a part is consumed in producing trinitrocellulose by action on the cellulose in the grain. Another portion is decomposed in its action on the starch, yielding nitrous acid, and the small amount which may still remain combines with a portion of the lime carbonate used in neutralizing, as explained, and forming nitrate of lime. The quantity of nitrate of lime is, however, so small as not to be at all objectionable.

Having thus fully described my said invention, and the manner in which the same is or may be carried into effect, what I claim, and desire to secure by Letters Patent, is—

1. The method of converting starch into glucose by subjecting the same to the action of nitrosulphuric acid, substantially as described.

2. The method of making from grain a saccharine solution by treating the grain, in a form containing substantially all the elements thereof, with nitrosulphuric acid at temperatures as indicated, in order to prevent the solution of the gluten, or the carbonization of the same, or of the woody fiber, as set forth.

3. In the preparation of glucose or sirup from grain, the method of treating the saccharine solution, after the conversion of the starch and separation of insoluble matters of the grain, by introducing into the boiling liquid, in vacuum-pans, sulphurous-acid gas, substantially as described.

4. The method of manufacturing commercial glucose or sirup from grain by treating the grain in a form containing substantially all the elements of the grain, with nitrosulphuric acid, at the temperatures indicated, until the starch is converted into glucose, neutralizing the acid in the liquor, separating the saccharine solution from the gluten or nitrogenous elements and the undissolved portions of the grain, so that they may be utilized as explained, concentrating said saccharine solution by boiling in vacuum-pans, and introducing sulphurous-acid gas during the operation, removing the precipitated salts, and extracting the sulphurous acid, and finally reducing, when necessary, the sirup to the desired consistency, substantially as described.

5. The herein-described sirup or glucose, containing substantially all the native saccharine elements of the grain, and being practically free from gluten, and the charred products of gluten, or of woody fiber, as set forth.

In testimony whereof I have signed this specification in the presence of two subscribing witnesses.

A. G. FELL.

Witnesses:
JOHN McCLURE,
J. TALMAN WATERS, Jr.